Oct. 16, 1951     J. YANCY     2,571,642
ROTARY INTERNAL-COMBUSTION ENGINE

Filed Feb. 27, 1948     3 Sheets-Sheet 2

INVENTOR.
Joseph Yancy
BY
McMorrow, Berman & Davidson
Attorneys

Oct. 16, 1951  J. YANCY  2,571,642
ROTARY INTERNAL-COMBUSTION ENGINE
Filed Feb. 27, 1948  3 Sheets-Sheet 3
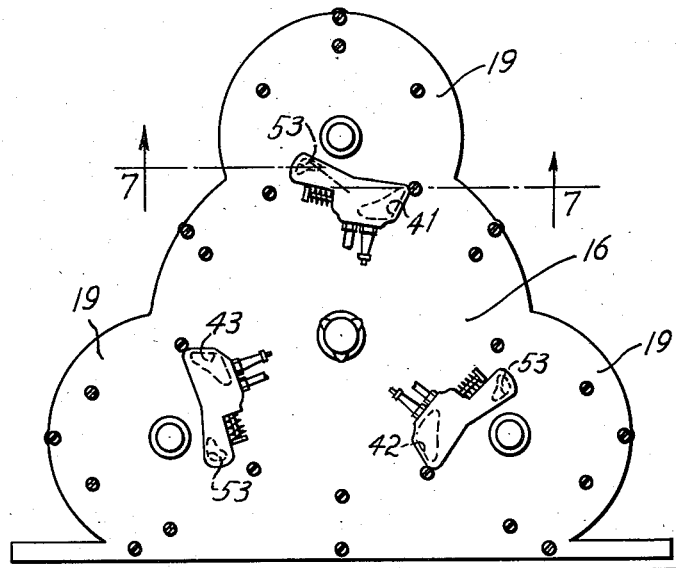
Fig. 5
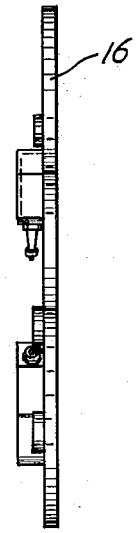
Fig. 6
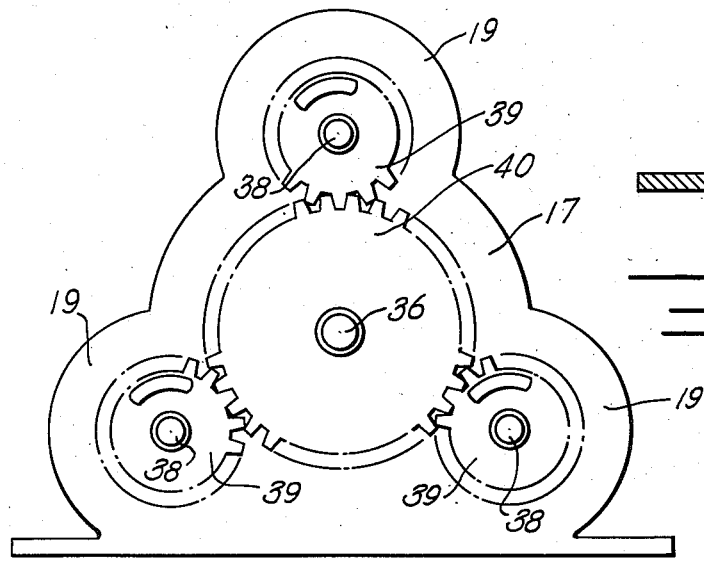
Fig. 7
Fig. 8
INVENTOR
Joseph Yancy
BY
McMorrow, German & Davidson
Attorneys Patented Oct. 16, 1951

2,571,642

UNITED STATES PATENT OFFICE 2,571,642

ROTARY INTERNAL-COMBUSTION ENGINE

Joseph Yancy, Coatesville, Pa.

Application February 27, 1948, Serial No. 11,735

2 Claims. (Cl. 123—13)

This invention relates to rotary internal combustion engines.

An object of the invention is the provision of an internal combustion engine in which reciprocating elements have been eliminated and in which a rotor of particular formation cooperates with a plurality of rotary pistons which are geared to the rotor and serve as compressing and valving pistons in such manner that a plurality of explosions occur during one revolution of the rotor, the rotary pistons being so arranged in connection with air inlet ports that said pistons act as air compressors and force air under pressure into associated combustion chambers into which fuel is injected.

A further object of the invention is the provision of a rotary internal combustion engine in which a rotor revolving in a housing has a pair of diametrically disposed heads with an arcuate chamber between said heads and an annular wall of the housing, one end of each head acting to expel exhaust gases from the chambers, the other ends of said heads being arranged to be acted on by explosive mixture to drive the rotor, a stationary combustion chamber being disposed on the housing adjacent to each combined rotary air compressor and pistons, the pistons being three in number and geared to the rotor shaft so that said pistons make two complete revolutions for each revolution of the rotor, said pistons controlling an intake port to each combustion chamber for air compressed by the pistons and also controlling exhaust ports, the pistons being arcuately shaped and moving periodically in to the arcuately shaped channels in the rotor chamber, the heads of the rotor controlling the flow of ignited expanding gases from the combustion chambers to the arcuate channels while the pistons are restricting the capacities of said arcuate chambers.

The invention consists in the novel construction, arrangements and combinations of parts hereinafter more particularly described and claimed.

In the drawings:

Figure 5 is a front view of the engine with the front plate in place and showing the combustion chambers carried thereby.

Figure 6 is an end view of the front plate.

Figure 7 is a horizontal section taken along the line 7—7 of Figure 5.

Figure 8 is a diagrammatic rear view of the engine showing the gearing between the rotor shaft and piston shafts, and Figure 9 is a view in perspective of the complete engine.

Figure 1:
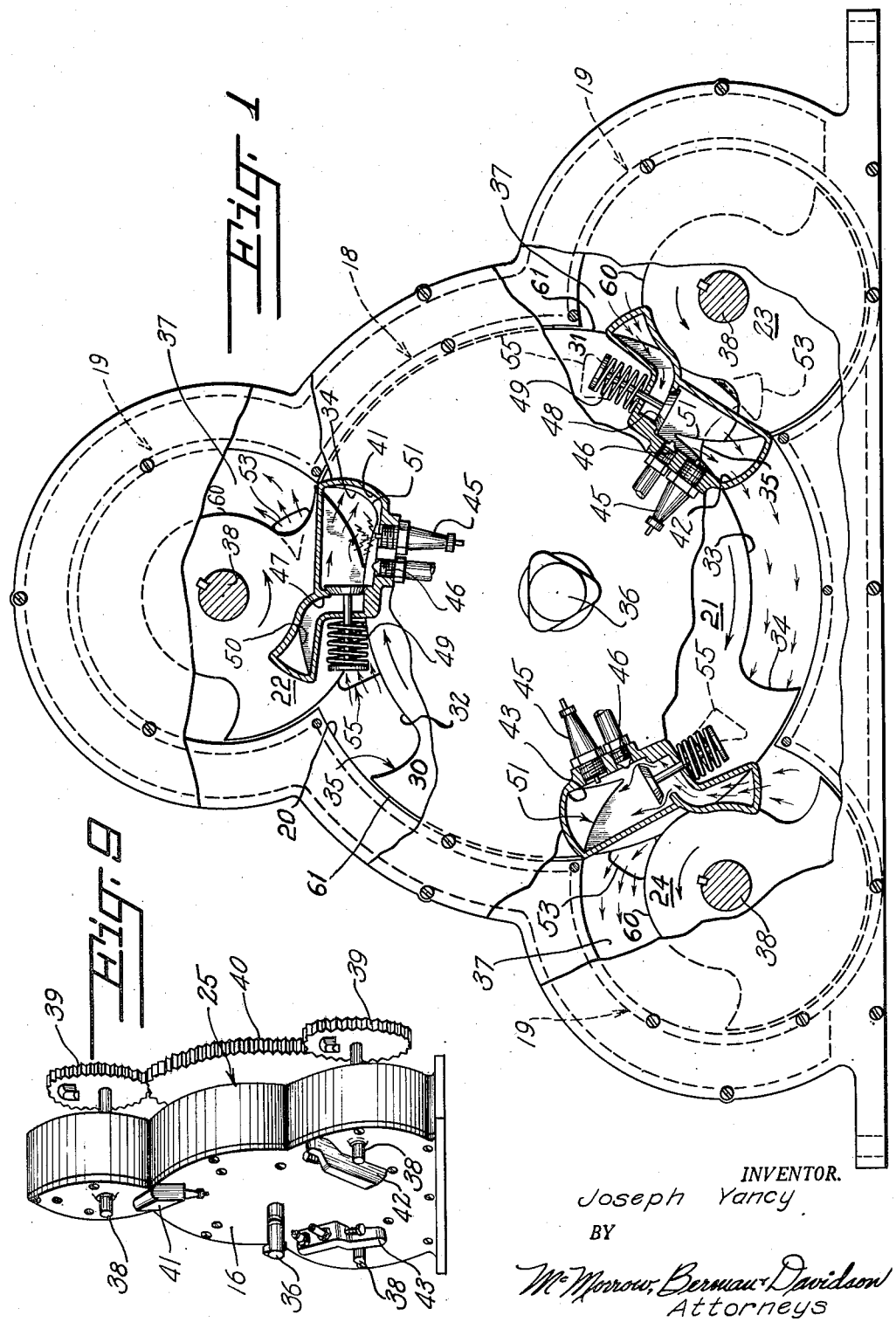
Figure 1 is a front view in elevation of my rotary internal combustion engine with parts of the housing broken away and with parts in sections.

Referring more particularly to the drawings, 15 designates a housing having a removable front plate 16 and a fixed rear plate 17. A front view of the housing shows a circular portion 18 and three semi-circular portions 19, the centers of which are one hundred and twenty degrees apart. The circular portion includes a cylindrical rotor chamber 20 (Figures 1, 2 and 4) in which revolves a rotor 21. In the semi-circular chambers are mounted rotary air-compressing and fuel valving pistons 22, 23 and 24. A shell 25 surrounds the housing to provide a space 26 into which a cooling means is supplied.

The rotor 21 has diametrically disposed heads 30 and 31 forming with the rotor chamber 20 a pair of arcuate channels 32 and 33. End portions 34 of each head are designated as pistons while the opposite end portions 35 are employed for expelling exhaust gases as will be presently explained. The rotor is fixed on a shaft 36.

Each rotary piston is arcuately shaped, thereby providing an arcuate channel 37 in each of the semi-circular piston chambers which open with the rotor chamber 20. Each rotary piston is keyed on a shaft 38 on which is secured a pinion 39. These pinions are in mesh with a large gear 40 secured to the rotor shaft 36. The ratio of the gears 39 and 40 is 2 to 1.

It will be noted (Figures 1 and 5) that there are three stationary combustion chambers 41, 42 and 43 which are located between the respective pistons 22, 23 and 24 and the rotor shaft 36 and are mounted on the outer side of the removable front plate or cover 16. Each combustion chamber is supplied with a spark plug 45 and a fuel injector 46 which is supplied with fuel under pressure by a pump (not shown) operated by the rotor shaft 36. Each combustion chamber is divided by a partition 47 having an opening closed normally by a valve 48. A spring 49 retains the valve closed until opened by air pressure created by the rotary pistons. Ports 50 opening through the inner walls of the combustion chambers into the rotor chamber 20 are controlled by the rotary pistons for admitting compressed air into said combustion chambers. Each combustion chamber has an outlet port 51 opening into the rotor chamber 20 to pass ignited fuel gas into related ones of the arcuate channels 32 and 33 and act upon the related ones of the rotor heads 30 and 31. The back wall 17 of the housing is provided with an air inlet port 53 for each rotary piston chamber 19. The ignited and expanded gases are discharged through exhaust ports 55.

Figure 2:
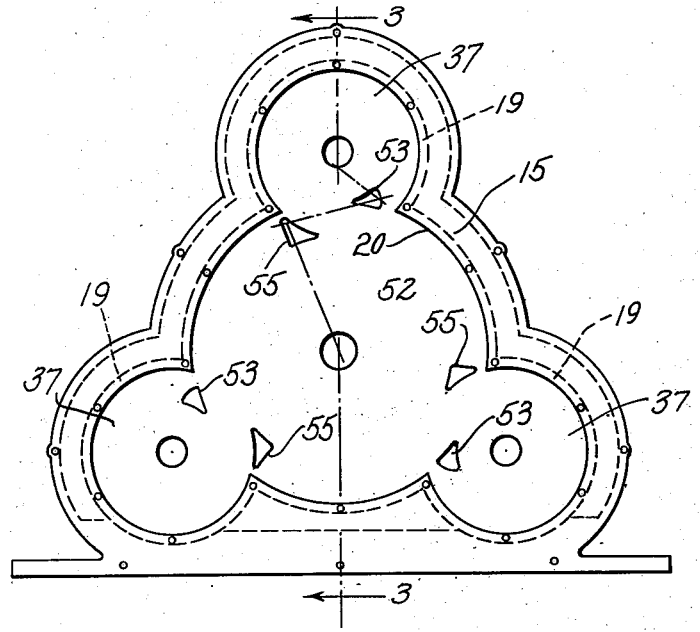
Figure 2 is a front view in elevation of the housing with the front plate, rotor, and pistons removed.
Figure 3:
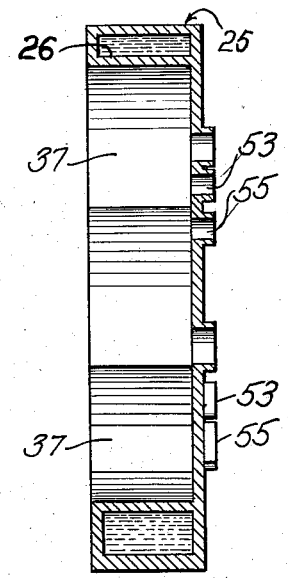
Figure 3 is a transverse vertical section taken along the line 3—3 of Figure 2.
Figure 4:
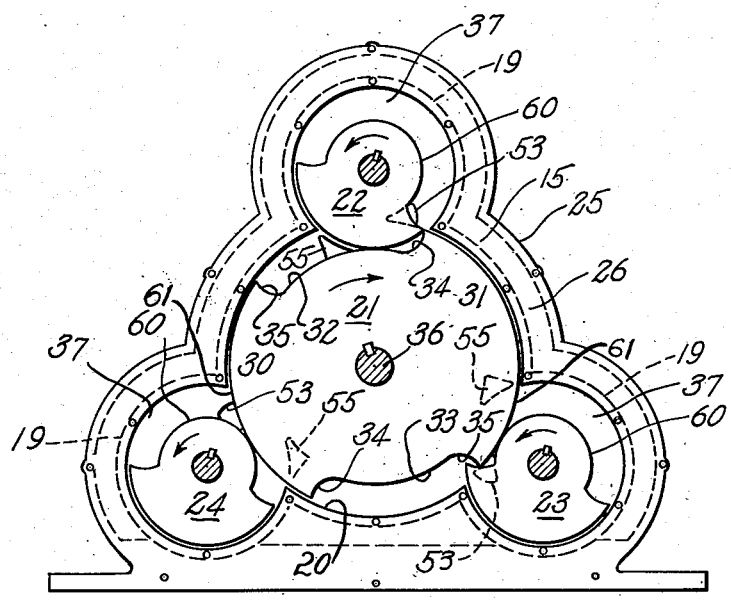
Figure 4 is a view similar to Figure 2 with the rotor and pistons in place.

Each rotary piston includes a circular portion whose surface 60 is adapted to roll periodically on the curved surface 61 of the heads 30 and 31 of the rotor 21, as shown in Figures 1 and 4. When the curved surfaces 60 and 61 are in contact and rolling on each other, the arcuately shaped channels 37 formed between the walls of the rotor chamber 20 and the pistons are being reduced progressively in volume for compressing air supplied to the channels through the inlet ports 53.

The operation of my motor is as follows:

Air is supplied through the ports 53 into each of the arcuate channels 37 after said ports have been uncovered by the respective abutments 22, 23 and 24. As shown more particularly in Figure 4, the port 53 has been uncovered by the abutment 24 while the abutment 22 has closed its associated port 53. Abutment 23 is compressing the air in the channel 37 in cooperation with the head 31 of the rotor 21 which abutment 22 is moving towards the compression action.

As illustrated in Figure 1, abutment 23 is forcing the compressed air into the combustion chamber 42 against valve 48 which is held to its seat by the spring 49. The air will be increased progressively and the valve will be opened. This position of one of the valves 48 is shown in the combustion chamber 43 where the discharge port 51 in said combustion chamber is closed by the head 30 of the rotor. Before the port 51 in chamber 43 is opened to the advancing arcuate chamber 33 fuel is injected into the compressed air in the chamber 43 and is ignited by the plug 45.

The position of chamber 41 (Figure 1) discloses that when the arcuate chamber 32 in the rotor reaches the exhaust port 55 adjacent to said chamber, the exhaust gases are discharged by the forwardly moving end 35 of the head 30 of the rotor 21. These exhaust gases, however, have been created by the preceding combustion chamber 43. At this time, the abutment 22 is in a position to divide the arcuate chamber 32 into two sections, one for exhausting, the other for power purposes. The burning and expanding gases from the combustion chamber 41 are acting on the piston or trailing end 34 of the head 31 of the rotor, thereby imparting power to said head. These gases, after expansion and the expenditure of energy, are carried in the chamber 32 to the exhaust port 53 associated with the combustion chamber 42 for discharge. The advancing end 35 of each head 30 and 31 not only forces the exhaust gases from the chambers 32 and 33 but closes or opens the exhaust ports 53 and the discharge ports 51 between the combustion chambers 41, 42, 43 and the arcuate chambers 32 and 33.

The power applied to the piston 34 of the heads 30 and 31 is continuous since the burning and expanding gases from the chambers 41, 42 and 43 will expend the energy thereof on the piston in a progressive manner. In other words, power will be applied to each head of the rotor approximately twice during a single revolution of the rotor.

While the description of the operation has been limited more or less to the function of the abutment 22 and combustion 41 and its related parts, nevertheless, it is to be understood that the other abutments 23 and 24, the respective combustion chambers 42 and 43 function in the same manner but in progressive succession.

The housing 18 includes the central chamber 20 with the chambers in the housings 19 disposed circumferentially about the central chamber and communicating therewith. However, communication between the central chamber and the chambers in the housings 19 is limited to the arcuate chambers 32, 33 and the arcuate channels 37 in said housings. The channels 37 and the chambers 32 and 33 are periodically displaced in synchronism with each other in order to carry out the functions of the engine. Furthermore, since each abutment makes two revolutions for one revolution of the rotor, said abutments will be projected in each arcuate chamber 32 and 33 during one revolution of the rotor to perform the series of functions described supra so that during a single revolution of the rotor two explosions will be produced by the cooperation of each abutment and the heads 32 and 33.

What is claimed is:

1. In a rotary engine, a housing comprising a central circular rotor chamber, a plurality of circumferentially spaced circular piston chambers surrounding said rotor chamber and opening into said rotor chamber, a first sidewall closing one side of said rotor and piston chambers, and a second sidewall closing the opposite sides of said rotor and piston chambers, combustion chambers mounted on said second sidewall, said second sidewall having air inlet ports providing communication between each combustion chamber and said rotor chamber and fuel inlet ports providing communication between the combustion chambers and the rotor chamber, a partition in each combustion chamber isolating said air and fuel ports, said partition being formed with an opening, a spring closed valve normally closing said opening, rotary pistons in said piston chambers formed with circumferentially extending channels registrable with the air and fuel ports of the piston chambers, said rotary pistons having circumferential portions arranged to occlude said air and fuel ports in positions in which the channels are not registered with the air and fuel ports, ignition means exposed in the combustion chambers at the fuel inlet port side of said partition, a fuel supply connected to the combustion chambers at the same side of the partition, and a rotor in said rotor chamber having circumferentially extending channels defining heads, said heads being arranged to occupy positions in which said heads close the openings between the combustion chambers and the rotor chamber and to occupy other positions in which said rotor channels are in communication with said openings, means operatively connecting said rotary pistons and said rotor for operation together, said first sidewall being formed with outside air inlet ports leading into the rotary piston chambers and with exhaust ports leading from said rotor chamber.

2. In a rotary engine, a housing comprising a central circular rotor chamber, a plurality of circumferentially spaced circular piston chambers surrounding said rotor chamber and opening into said rotor chamber, a first sidewall closing one side of said rotor and piston chambers, and a second sidewall closing the opposite sides of said rotor and piston chambers, combustion chambers mounted on said second sidewall, said second sidewall having air inlet ports providing communication between each combustion chamber and said rotor chamber, and fuel inlet ports providing communication between the combustion chambers and the rotor chamber, a partition in each combustion chamber isolating said air and fuel ports, said partition being formed with an opening, a spring closed valve normally closing said opening, rotary pistons in said piston chambers formed with circumferentially extending channels registrable with the air and fuel ports of the piston chambers, said rotary pistons having circumferential portions arranged to occlude said air and fuel ports in positions in which the channels are not registered with the air and fuel ports, ignition means exposed in the combustion chambers at the fuel inlet port side of said partition, a fuel supply connected to the combustion chambers at the same side of the partition, and a rotor in said rotor chamber having circumferentially extending channels defining heads, said heads being arranged to occupy positions in which said heads close the openings between the combustion chambers and the rotor chamber and to occupy other positions in which said rotor channels are in communication with said openings, means operatively connecting said rotary pistons and said rotor for operation together, said first sidewall being formed with outside air inlet ports leading into the rotary piston chambers and with exhaust ports leading from said rotor chamber, said second sidewall comprising a plate bodily removable from said housing, said combustion chambers being mounted on the outer side of said plate whereby said combustion chambers are removed from said housing on removal of said plate from the housing.

JOSEPH YANCY.

REFERENCES CITED

The following references are of record in the file of this patent:

UNITED STATES PATENTS

| Number | Name | Date |
|---|---|---|
| 1,038,424 | Novy | Sept. 10, 1912 |
| 1,193,808 | McCarthy | Aug. 8, 1916 |
| 1,239,694 | Jackman | Sept. 11, 1917 |
| 1,446,079 | Wood | Feb. 20, 1923 |
| 1,933,442 | Maxwell | Oct. 31, 1933 |
| 2,198,130 | Schweiger | Apr. 23, 1940 |